United States Patent [19]
Noe

[11] Patent Number: 4,909,544
[45] Date of Patent: Mar. 20, 1990

[54] APPARATUS FOR THE TRANSFER OF GRANULAR, PULVERULENT OR LIQUID MATERIALS

[75] Inventor: Claude Noe, Venelles, France

[73] Assignee: Commissariat a l'Energie Atomique, Paris, France

[21] Appl. No.: 216,357

[22] Filed: Jul. 7, 1988

[30] Foreign Application Priority Data

Jul. 8, 1987 [FR] France ............................ 87 09701

[51] Int. Cl.⁴ .............................................. F16L 55/00
[52] U.S. Cl. ...................................... 285/18; 285/168; 285/184; 285/912
[58] Field of Search ................... 285/168, 184, 912, 18

[56] References Cited

U.S. PATENT DOCUMENTS

| | | | |
|---|---|---|---|
| 396,710 | 1/1889 | Prunty | 285/184 X |
| 557,799 | 4/1896 | Gorter | 285/184 X |
| 1,067,516 | 7/1913 | Gleeson | 285/184 X |
| 2,739,778 | 3/1956 | Krone et al. | 285/184 X |
| 3,353,847 | 11/1967 | Brown | 285/18 |

FOREIGN PATENT DOCUMENTS

| | | | |
|---|---|---|---|
| 528162 | 7/1956 | Canada | 285/168 |
| 2108041 | 9/1971 | Fed. Rep. of Germany . | |

Primary Examiner—Thomas F. Callaghan
Attorney, Agent, or Firm—Michael N. Meller

[57] ABSTRACT

Apparatus for the transfer of material from one container to another container. The one container is placed in an attachment having a 45° coupling joined by a straight bend to a fixed part with a 45° second coupling. A motor rotates bend relative to the fixed part. Gears ensure an equivalent joint rotation of the attachment with respect to the bend. The one container is turned over and its content flows into the other container. This apparatus is particularly useful with polluting, toxic and radioactive products.

6 Claims, 3 Drawing Sheets

APPARATUS FOR THE TRANSFER OF GRANULAR, PULVERULENT OR LIQUID MATERIALS

DESCRIPTION

The present invention relates to an apparatus for the transfer of granular, pulverulent or liquid or similar materials from one container to another container, receptacle or reservoir. The main interest of this apparatus is that the transfer takes place in a reliable manner and along an entirely closed path, which makes this apparatus, which is applicable to all materials belonging to the aforementioned categories, of particular interest in connection with those materials having a polluting or dangerous character and for which it is necessary to avoid any flow into the external medium.

For such materials, ordinary transfer carried out by the inverting of the container above the mouth of the reservoir is not suitable, because there are risks of the premature reversal of the container and an outflow of particles or fluid around the mouth.

Security can be improved by means of a flexible coupling connected to the reservoir and fitted to the opening of the container, but the latter must be especially adapted to said coupling, which is not very strong and therefore has inadequate reliability. In particular, it is necessary to insert gaskets, which will in due course be reached by the transferred product, which will corrode the same.

Similar criticisms can be made in connection with the apparatus described in U.S. Pat. No. 4,569,623 and which comprises two elbows or bends placed end to end on either side of a vertical joining plane and whereof one pivots parallel to said plane. The free end of the container is attached and is brought from a top-open, lower position into an inverted upper position, where its content flows out into the bends. However, nothing is done against powder which enters the joining plane. However, the bends cannot be fitted into one another, because it is necessary for the container to be vertical in its attachment position and in its discharge position, which would impose two right-angled bends joined by horizontal sections where the powder could not flow.

The invention represents an improvement to these transfer apparatuses and makes it possible to obviate the disadvantages thereof. It comprises a coupling formed from three bent rigid parts, which are fitted into one another and whereof one is integral with the reservoir and the other is coupled to the container, said parts being inseparable and defining a transfer path for the products, because the different parts can turn with respect to the others in such a way as to in particular define two positions. In the first of these positions, the container is located below the coupling, being positioned vertically with its opening upwards. In the second position, it is reversed and is above the coupling, in such a way that its content flows out by gravity in the transfer path to the reservoir. In a preferred construction, the rotations are performed simultaneously with the aid of a gear train joining the different parts of the coupling and actuated by a motor.

More specifically, the invention relates to an apparatus for the transfer of granular, pulverulent or liquid materials contained in a first open container towards a second open container, comprising an attachment constituted by a structure for maintaining and fixing the first container whose opening is placed against a mouth extended by a first connecting part, a bend, a second connecting part communicating with the second container and placed above its opening, but below the bend, the bend fitting into the second coupling part and the first coupling part fitting into the bend, whereby the bend can turn with respect to the second coupling part and the first coupling part is able to turn with respect to the bend, axial connection means making it impossible to extract the bend from the second coupling part and the first coupling part from the bend, the first coupling part and the bend being able to turn respectively with respect to the bend and with respect to the second coupling part, so that the attachment is moved between a position where it is below the bend and where the first container has its opening upwards and a position where it is above the bend and where the first container has its opening downwards.

In an advantageous embodiment, the bend is approximately at right angles and the couplings form angles of approximately 45°. Finally, according to an advantageous feature which can be combined with the preceding feature, the bend is rotated by means of a motor via a transmission and each coupling comprises a toothed surface, the bend comprising a rotating shaft terminated by two toothed pinions, each pinion meshing with a respective toothed surface, the ratios of the number of teeth of each toothed surface divided by the number of teeth of the pinion meshing therewith being identical, involving a rotation of the bend with respect to the second coupling part of the same value of the rotation of the first coupling part with respect to the bend.

The invention is described in greater detail hereinafter relative to non-limitative embodiments and the attached drawings, wherein.

Figure 2:
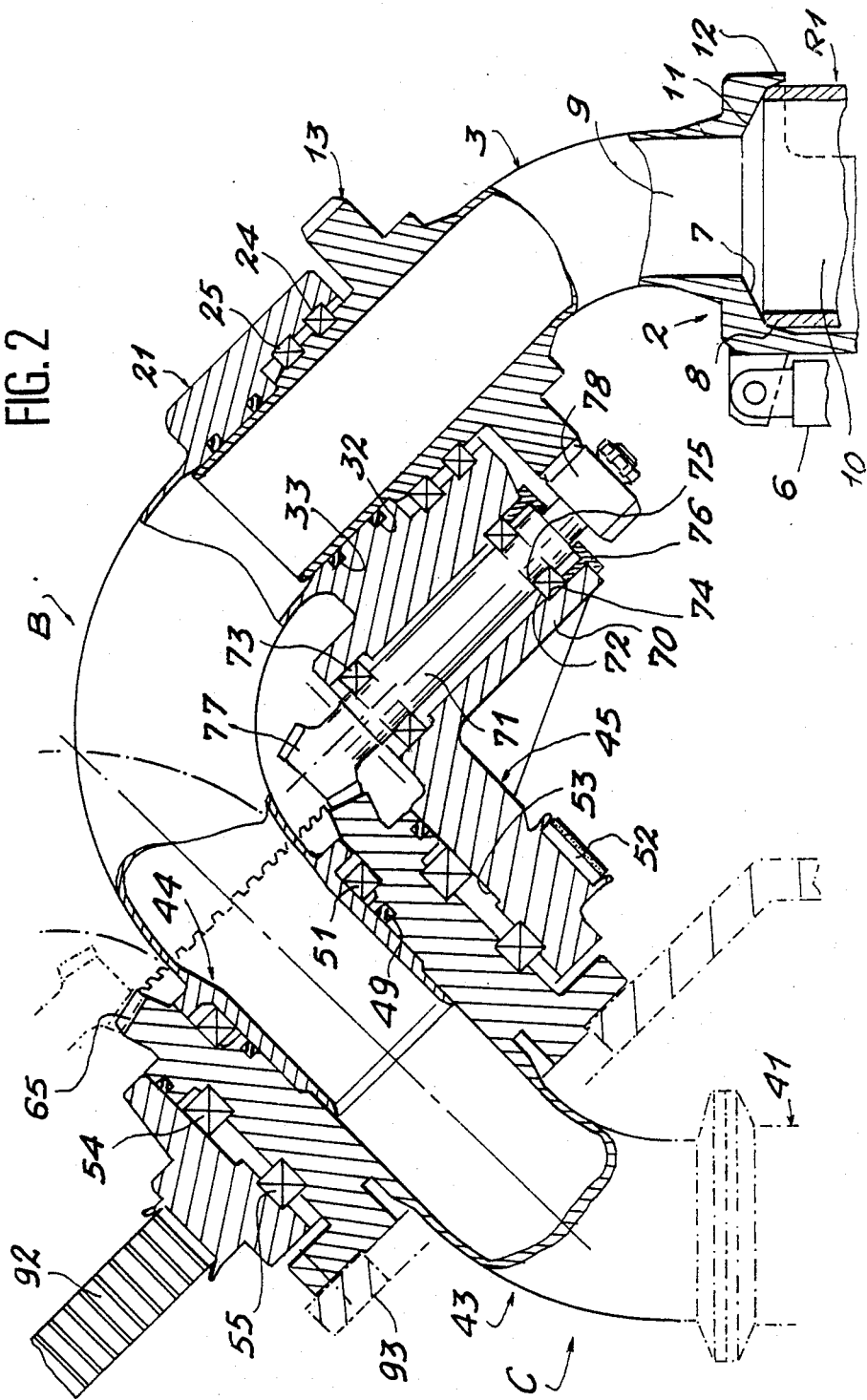
FIG. 2 is a detailed schematic of FIG. 1 in partial section.
Figure 3:
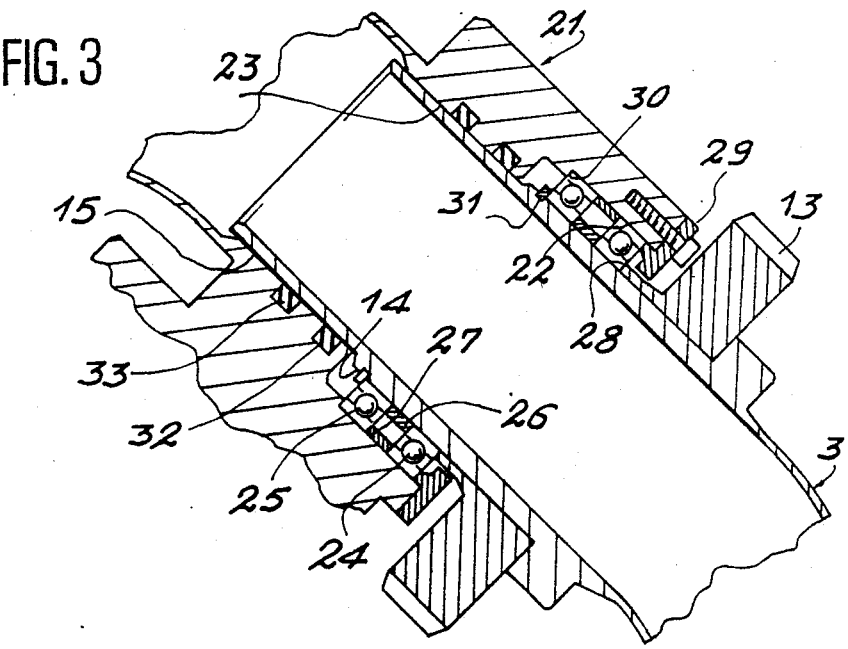
Figure 4:
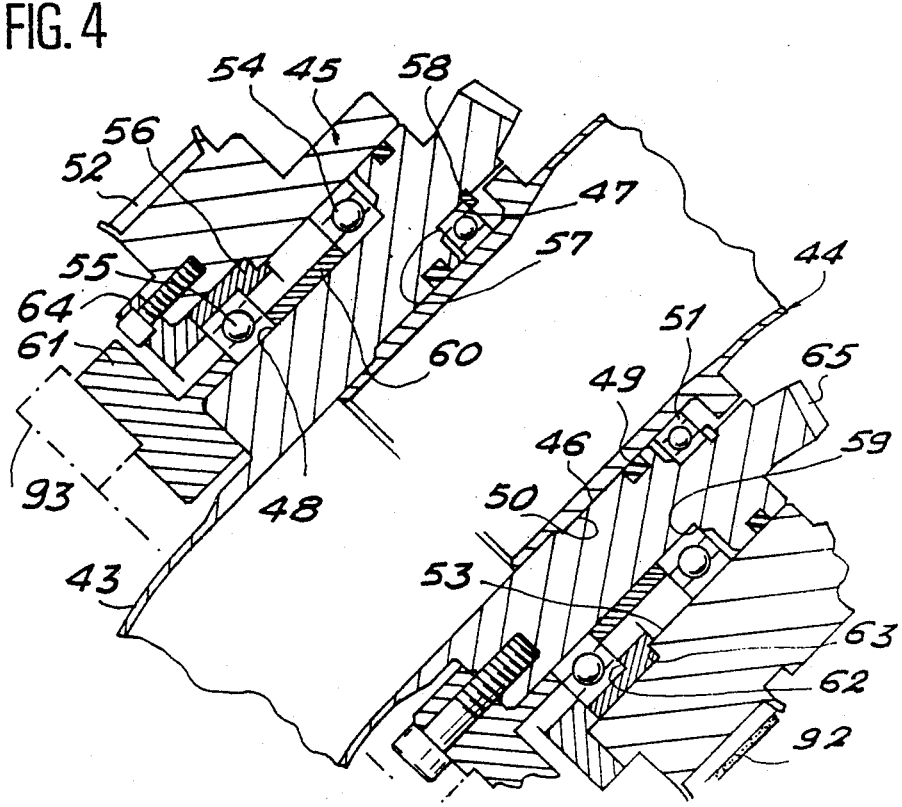

FIGS. 3 and 4 respectively show details from FIG. 2.

Figure 1:
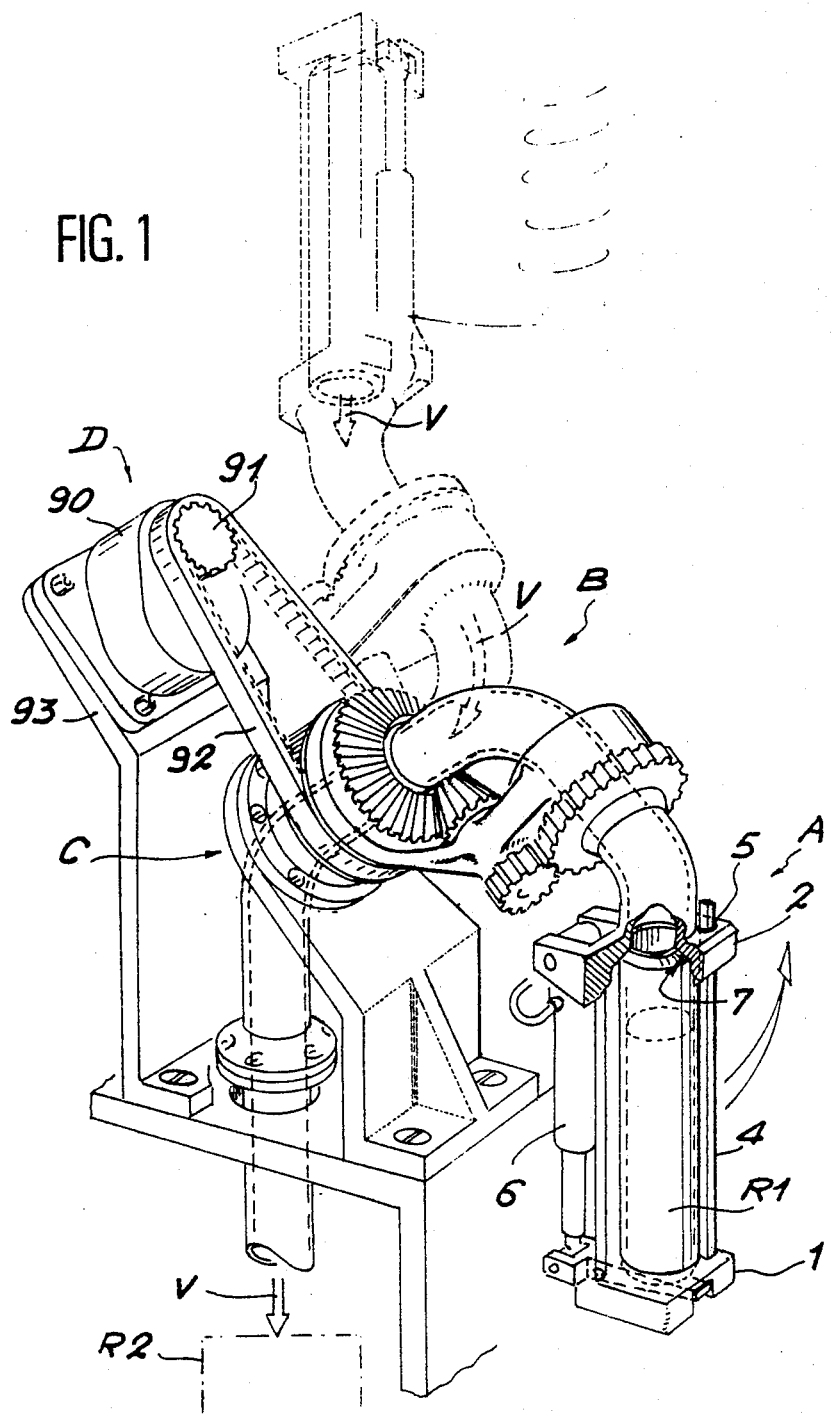
FIG. 1 is a perspective view of the apparatus and its operation.

The apparatus can comprise several large parts, as can be seen in FIG. 1. Container R1, from which it is necessary to transfer the content into a reservoir R2, is maintained in place in an attachment means A, which is connected by a bend B to a fixed part C having a pipe issuing into reservoir R2. A motor means D enables the movement of bend B and attachment means A.

Attachment means A firstly comprises a base 1 on which rests the container R1, a funnel or hopper 2 above container R1 and a first coupling 3 integral with hopper 2, which extends the opening and which is bent so as to form an angle of approximately 45°. Base 1 is provided with parallel posts 4 arranged laterally with respect to container R1 and the ends of which slide in the holes 5 of hopper 2, so as to allow relative translation movement of base 1 and hopper 2, the spacing being regulated by a jack 6 arranged parallel to the posts 4. Jack 6 gradually makes it possible to move the hopper 2 away from the base 1, so as to make it possible to introduce container R1 between them and then to move them together and maintain the container R1 firmly in place. The inner conical surface of hopper 2, which is designated by the general reference 7, then contacts the edge 8 of container R1. The interior 9 of hopper 2 and the first coupling 3 thus communicates with the interior 10 of the container R1 and surmounts the same.

Hopper 2 can be specially adapted to container R1. Its inner surface 7 then comprises two conical adjacent surfaces 11 and 12 (see FIG. 2) which have different inclinations, so as to define a concave connection of the same diameter as that of the edge 8, which enables container R1 to be kept in place in a stable manner.

The first coupling 3 is successively provided, on moving away from base 2, with a toothed wheel 13, integral therewith (screwed or force fitted), a cylindrical bearing surface 14 and a cylindrical connecting surface. These two surfaces are located on the outer surface of the first coupling 3 and the diameter of connecting surface 15 is smaller than the diameter of bearing surface 14.

Bend B forms an angle of approximately 90°. Like the first coupling 3, it is tubular. At one of its ends 21, it has a first inner, cylindrical bearing surface 22 and a first inner, cylindrical coupling surface 23 of smaller diameter. When the apparatus is assembled, the first coupling 3 is fitted into the end 21 of bend B, in such a way that the connecting surfaces 15 and 23 are spaced with a small clearance. Moreover, two ball bearings 24,25 are located between the bearing surfaces 14,22 and are mounted in such a way as to prevent the separation of bend B and attachment means A. FIG. 3 shows the arrangement adopted for this purpose. Two spacers 26,27, respectively close to the first coupling 3 and the end 21 of bend B, ensure the spacing of the two bearings 24,25. One of the bearings 24 is also locked in translation from the opposite side, on the one hand by a shoulder 28 of the first coupling 3 and on the other hand by a flange 29 screwed to the end 21 of bend B. The second bearing 25 is locked in translation from the other side of spacers 26 and 28, on the one hand by a shoulder 30 of end 21 and on the other hand by an elastic ring 31 inserted in a groove made in the bearing surface 14 of the first coupling 3. Coupling surface 23 of end 21 has two grooves, each receiving a gasket 32,33.

The fixed part C firstly comprises (FIG. 2) a pipe 41 issuing into reservoir R2. It also comprises a second coupling 43 forming an angle of approximately 45° and joining pipe 41 to the other end 44 of bend B and to a ring 45 integral with bend B. The second end 44 of bend B is fitted into the second coupling 43 and ring 45 is arranged around the second coupling 43.

The second coupling 43 is tubular (see FIG. 4) and comprises, on its inner surface, a connecting surface 46 and a larger diameter, first bearing surface 47. On its outer surface it comprises a second bearing surface 48 of larger diameter than the first bearing surface 47 (all the bearing surfaces being cylindrical). The connecting surface 46 has a groove for housing a circumferential gasket 49.

The second end 44 of bend B is externally provided with a cylindrical connecting and bearing surface 50. A bearing 51 is arranged between bearing surface 50 of the second end 44 and the first bearing surface 47 of the second coupling 43.

Ring 45 is externally provided with a cylindrical grooved surface 52 and also has an inner cylindrical bearing surface 53. A bearing 54 is located between the second bearing surface 48 of the second coupling 43 and the bearing surface 53 of ring 45; another bearing 55 is located between the second bearing surface 48 of the second coupling 43 and a spacer 56 disposed on the bearing surface 53 of ring 45.

Bearing 51 is axially maintained in place between a shoulder 57 and an elastic ring 58, both of them arranged on the first bearing surface 47 of the second coupling 53. Ring 45 and consequently bend B are axially fixed with respect to the second coupling 43 by means of bearings 54,55. Bearing 54 is axially fixed between a shoulder 59 and a spacer 60 arranged on the second bearing surface 48 of the second coupling 43. The other bearing 55 is axially fixed between spacer 60 and a flange 61 screwed onto the second coupling 43 on the one hand, between a shoulder 62 of spacer 66 (itself axially bearing on a shoulder 63 of ring 45) and a flange 64 screwed to ring 45 on the other. It can be seen that is impossible to extract bend B from the fixed part C, although they are rotatable relative to one another. The respective connecting surfaces 46 and 50 have a small clearance between them and the movement takes place via three bearings 51,54,55.

The second coupling 43 is finally provided with a toothed ring 65 at its end opposite to pipe 41. According to FIG. 2, a bearing 70 connects the first end 21 of bend B to ring with the aid of a pair of bearings 72,73. The axial positioning of shaft 71 in bearing 70 is ensured by placing one of the bearings 72 between the shoulders 74 and 75 respectively belonging to the bearing 70 and shaft 71 and a flange 76 screwed to bearing 70. Bearings 72,73 are locked on shaft 71. Shaft 71 is provided at both its ends with pinions 77,78. Pinion 77 meshes with the toothed ring 65 of the second coupling 43 and pinion 78 meshes with the toothed wheel 13 integral with the first coupling 3.

The motor means D comprises an electric motor 90, whose shaft is provided with a toothed wheel 91 which tensions notched belt 92 with respect to the grooved surface 52 of ring 45. Motor 90 is fixed to a frame 93 and is stationary with respect to the fixed part C and reservoir R2.

The apparatus operates as follows. Container R1 is placed on base 1, after which jack 6 is retracted and edge 8 engages hopper 2, giving the configuration shown in FIGS. 1 and 2. Motor 90 is then started up and the notched belt 92 starts to move and rotates ring 45 and consequently bend B. Pinion 77 consequently passes over the circumference of the toothed ring 65 and is rotated by the latter and via shaft 71 while pinion 78 in turn imparts a rotation to the toothed wheel 30 and to the attachment means A. Advantageously, the ratios of the number of teeth of the toothed wheel 13 divided by the number of teeth of pinion 78 and the number of teeth of the toothed ring 65 divided by the number of teeth of pinion 77 are identical, although a rotation of bend B relative to the fixed part C corresponds to a rotation of the same value of the attachment means A with respect to bend B. With a vertical pipe 41 and a second coupling 43 forming an angle of 45°, a bend B forming an angle of 90° and at first coupling 3 forming an angle of 45°, with the container R1 vertical at the outset, the action of motor 90 finally gives the apparatus the configuration shown in superimposed form in FIG. 1. Bend B has performed a half-turn and the attachment means A is now largely vertical and above bend B, so that container R1 is vertical, but it is inverted and its content has escaped by gravity in as indicated by arrows B into the interior of the first coupling 3, bend B, second coupling 43 and pipe 41 to reservoir R2.

This path only has slopes of at least 45°, so that it is not possible for the material to be held back by adhesion along the walls. Moreover, the fitting of the first coupling in the first end 21 of bend B and of the second end 44 of bend B in the second coupling 43 prevent the content of the container R1 from passing between the connecting surfaces and consequently does not attack the gaskets. The movements involve rotations about themselves of all the sections of bend B and the attachment means A, which aids the disengagement of any material which might adhere thereto. It is readily apparent that the incorporation of such an apparatus into an automatic transfer chain would present no problems. It would merely be necessary to place space 1 at the end of a roller path conveying the containers R1 and to place the latter on the base with the aid of a gripper. The gripper would then recover the empty containers following a complete rotation of the apparatus, which would only require a simple control system. One application is the transfer of radioactive plutonium oxide powder.

I claim:

1. An apparatus for transferring material from a first container having an opening to a second container having an opening, comprising means for holding said first container, a first connection means attached to said holding means and having a channel one end of which communicates with said opening of said first container, a second connection means having a channel one end of which communicates with said opening of said second container, and a third connection means having a channel with two ends which respectively communicate with another end of said channel of first connection means and another end of said channel of said second connection means, said third connection means having a first portion which is rotatably coupled to said first connection means for rotation relative thereto about a first axis and a second portion which s rotatably coupled to said second connection means for rotation relative thereto about a second axis, said first and second axes being non-parallel, and further comprising gear means for coupling rotation of said first portion of said third connection means relative to said first connection means and rotation of said second portion of said third connection means relative to said second connection means, whereby said one end of said channel of said first connection means is moved from a position below a highest part of said third connection means to a position above said highest part and said opening of said first container is moved from a position above the material in said container to a position below said material, said material thereby flowing from said first container to said second container under the influence of gravity via said channels of said first, second and third connection means.

2. The apparatus as defined in claim 1, wherein said first and second portions of said third connection means are substantially mutually perpendicular.

3. The apparatus as defined in claim 1, further comprising means for driving said gear means.

4. The apparatus as defined in claim 3, wherein said driving means comprises a motor and a transmission.

5. The apparatus as defined in claim 1, wherein said gear means comprises a rotatable shaft having first and second toothed pinions fixed thereon, a first toothed surface fixed on said second connection means and a second toothed surface fixed on said first connection means, said first toothed pinion being meshed with said first toothed surface and said second toothed pinion being meshed with said second toothed surface.

6. The apparatus as defined in claim 1, further comprising first sealing means arranged between said first and third connection means, and second sealing means arranged between said second and third connection means.

* * * * *